(12) United States Patent
Park et al.

(10) Patent No.: US 10,225,089 B2
(45) Date of Patent: Mar. 5, 2019

(54) PER-DEVICE AUTHENTICATION

(71) Applicant: Google LLC, Mountain View, CA (US)

(72) Inventors: Keun young Park, Santa Clara, CA (US); Rakesh Narayan Iyer, Sunnyvale, CA (US); Nicholas Julian Pelly, Manly (AU)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/923,784

(22) Filed: Mar. 16, 2018

(65) Prior Publication Data

US 2018/0205560 A1 Jul. 19, 2018

Related U.S. Application Data

(63) Continuation of application No. 14/311,377, filed on Jun. 23, 2014.

(51) Int. Cl.
| | |
|---|---|
| *H04L 9/32* | (2006.01) |
| *H04L 29/06* | (2006.01) |
| *G06F 21/44* | (2013.01) |
| *H04W 12/06* | (2009.01) |
| *H04L 9/08* | (2006.01) |

(52) U.S. Cl.
CPC ............ *H04L 9/3268* (2013.01); *G06F 21/44* (2013.01); *H04L 9/0866* (2013.01); *H04L 9/3247* (2013.01); *H04L 63/0823* (2013.01); *H04W 12/06* (2013.01); *G06F 2221/2129* (2013.01)

(58) Field of Classification Search
CPC ............ H04L 63/0823; H04L 63/0876; H04L 9/3247; H04L 9/3263; H04L 9/3268; H04W 12/06
See application file for complete search history.

(56) References Cited

U.S. PATENT DOCUMENTS

| | | | | |
|---|---|---|---|---|
| 6,792,113 | B1 * | 9/2004 | Ansell | G06F 21/10 380/284 |
| 8,078,874 | B2 * | 12/2011 | You | H04L 9/0869 713/175 |
| 2002/0087877 | A1 * | 7/2002 | Grawrock | G06F 21/34 726/26 |

(Continued)

OTHER PUBLICATIONS

Prosecution History from U.S. Appl. No. 14/311,377, dated Feb. 8, 2016 through Feb. 5, 2018, 145 pp.

*Primary Examiner* — Linglan E Edwards
(74) *Attorney, Agent, or Firm* — Shumaker & Sieffert, P.A.

(57) ABSTRACT

Systems and techniques are provided for per-device authentication. A hardware serial number associated with a hardware component of a computing device may be received. The hardware serial number may be converted to a hardware key check. A hardware key associated with a certificate from the computing device may be received. The hardware key may be compared to the hardware check key to obtain a verification of the certificate. The certificate may be verified when the hardware key check matches the hardware key and the certificate may not be verified when the hardware key check does not match the hardware key. A signature associated with the certificate may be verified. Access to the data processing apparatus by the computing device may be permitted when the certificate is verified and the signature is determined to be authentic.

20 Claims, 6 Drawing Sheets

(56) References Cited

U.S. PATENT DOCUMENTS

| | | | |
|---|---|---|---|
| 2005/0086468 A1* | 4/2005 | Meandzija | H04L 63/0428 |
| | | | 713/156 |
| 2006/0200857 A1* | 9/2006 | Yokota | H04L 63/0823 |
| | | | 726/6 |
| 2008/0127177 A1* | 5/2008 | Oh | G06F 21/10 |
| | | | 717/174 |
| 2008/0133918 A1* | 6/2008 | You | H04L 9/0869 |
| | | | 713/175 |
| 2008/0141027 A1* | 6/2008 | Kim | H04L 9/3218 |
| | | | 713/156 |
| 2008/0209545 A1* | 8/2008 | Asano | H04L 9/3273 |
| | | | 726/19 |
| 2011/0247045 A1* | 10/2011 | Rajagopal | H04L 63/08 |
| | | | 726/1 |
| 2012/0254610 A1* | 10/2012 | Li | G06F 21/10 |
| | | | 713/158 |
| 2013/0339740 A1* | 12/2013 | Ben-Shalom | H04L 9/3268 |
| | | | 713/175 |
| 2014/0337950 A1 | 11/2014 | Yang et al. | |
| 2015/0372825 A1 | 12/2015 | Park et al. | |

* cited by examiner

PER-DEVICE AUTHENTICATION

This application is a continuation of U.S. application Ser. No. 14/311,377, filed Jun. 23, 2014, the entire contents of which is hereby incorporated by reference.

BACKGROUND

A smartphone, tablet, or other mobile computing device may be connected to the head unit of a car's audio/visual system or other vehicle computing device. The head unit may need to authenticate any smartphone that connects to it, to ensure that the smartphone is authorized to connect to and interact with the head unit. This may be done by issuing every smartphone, tablet, or other mobile computing device its own unique certificate. Issuing a unique certificate to every authorized mobile computing device may prevent certificates from being stolen and used on any other authorized or non-authorized mobile computing devices. The number of certificates required to ensure that every mobile computing device may be very large, and it may difficult to generate unique signatures for that many certificates.

BRIEF SUMMARY

According to an embodiment of the disclosed subject matter, a hardware serial number associated with a hardware component of a computing device may be received. The hardware serial number may converted to a hardware key. The hardware key may be stored as part of a certificate. The certificate may include a signature. The certificate may be sent to the computing device. A second hardware serial number associated with second hardware component of a second computing device may be received. The second hardware component may be of the same type as the hardware component. The second hardware serial number may be converted to a second hardware key. The second hardware key may be stored as part of a second certificate. The second certificate may include a second signature equivalent to the signature. The second certificate may be sent to the second computing device.

Converting the hardware serial number to a hardware key may include hashing the hardware serial number to obtain a hash. A portion of the hash may discarded. The hardware component may be a USB chip or network interface card. The signature may be generated for use with SSL.

A hardware serial number associated with a hardware component of a computing device may be received. The hardware serial number may be converted to a hardware key check. A hardware key associated with a certificate from the computing device may be received. The hardware key may be compared to the hardware check key to obtain a verification of the certificate. The certificate may be verified when the hardware key check matches the hardware key and the certificate may not be verified when the hardware key check does not match the hardware key. A signature associated with the certificate may be verified. Access to the data processing apparatus by the computing device may be permitted when the certificate is verified and the signature is determined to be authentic.

A second hardware serial number associated with a second hardware component of a second computing device may be received. The second hardware component may be of the same type as the hardware component of the first computing device. The second hardware serial number may be converted to a second hardware key check. A second hardware key associated with a second certificate from the second computing device may be received. The second hardware key may be compared to the second hardware key check to obtain a verification of the second certificate. The second certificate may be verified when the second hardware key check matches the second hardware key and the second certificate may not be verified when the second hardware key check does not match the second hardware key, and wherein a second signature equivalent to the signature is associated with the second certificate. The second signature may be authenticated. Access may be permitted to the data processing apparatus by the second computing device when the second certificate is verified and the second signature is determined to be authentic.

Converting the hardware serial number to a hardware key check may include hashing the hardware serial number to obtain a hash. A portion of the hash may discarded. Converting the hardware serial number to a hardware key check may be performed based on a manner in which the hardware key was generated from the hardware serial number when the certificate was issued to the computing device. The hardware component may be a USB chip or network interface card. The data processing apparatus may be a vehicle computing device and the computing device may be a mobile computing device.

According to an embodiment of the disclosed subject matter, a means for receiving a hardware serial number associated with a hardware component of a computing device, a means for converting the hardware serial number to a hardware key, a means for storing the hardware key as part of a certificate, where the certificate may include a signature, a means for sending the certificate to the computing device, a means for receiving a second hardware serial number associated with second hardware component of a second computing device, where the second hardware component may be of the same type as the hardware component, a means for converting the second hardware serial number to a second hardware key, a means for storing the second hardware key as part of a second certificate, where the second certificate may include a second signature equivalent to the signature, a means for sending the second certificate to the second computing device, a means for converting the hardware serial number to a hardware key including a means for hashing the hardware serial number to obtain a hash, and a means for discarding a portion of the hash, are included.

A means for receiving a hardware serial number associated with a hardware component of a computing device, a means for converting the hardware serial number to a hardware key check, a means for receiving a hardware key associated with a certificate from the computing device, a means for comparing the hardware key to the hardware check key to obtain a verification of the certificate, a means for verifying the certificate when the hardware key check matches the hardware key and not verifying the certificate when the hardware key check does not match the hardware key, a means for authenticating a signature associated with the certificate, a means for permitting access to the data processing apparatus by the computing device when the certificate is verified and the signature is determined to be authentic, a means for receiving a second hardware serial number associated with a second hardware component of a second computing device, wherein the second hardware component is of the same type as the hardware component of the first computing device, a means for converting the second hardware serial number to a second hardware key check, a means for receiving a second hardware key associated with a second certificate from the second computing device, a means for comparing the second hardware key to the second hardware key check to obtain a verification of the second certificate, and a means for verifying the second certificate when the second hardware key check matches the second hardware key and not verifying the second certificate when the second hardware key check does not match the second hardware key, and wherein a second signature equivalent to the signature is associated with the second certificate, a means for authenticating the second signature, a means for permitting access to the data processing apparatus by the second computing device when the second certificate is verified and the second signature is determined to be authentic, means for converting the hardware serial number to a hardware key check including a means for hashing the hardware serial number to obtain a hash, and a means for discarding a portion of the hash, are also included.

Systems and techniques disclosed herein may allow for per-device authentication. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Per-device authentication using a hardware key to be used with certificates using duplicate signatures on mobile computing devices may allow for authentication of the mobile computing devices on a per-device basis without requiring the generation of a unique signature for each certificate. Mobile computing devices, such as smartphones and tablets, may use certificates to authenticate themselves to other computing devices, for example, vehicle computing devices such as the head unit of a car's audio/visual system. Different mobile computing devices may be given certificates that have the same signature. To ensure that the certificates cannot be taken off of the mobile computing device's they were issued to and used on other mobile computing devices, the certificate may also include a hardware key. The hardware key in a certificate may be generated based on the serial number of a hardware component of the mobile computing device to which the certificate was issued. Two mobile computing devices may have certificates with the same signature, but differing hardware keys. When authenticating a mobile computing device's certificate, the vehicle computing device may retrieve the hardware serial number that was used to generate the hardware key, and may generate another hardware key, which may be used as a hardware key check, in the same manner. If the hardware key generated by the vehicle computing device matches the hardware key stored in the certificate of the mobile computing device, the vehicle computing device may proceed to authenticate the signature in the certificate. Otherwise, if the hardware keys do not match, the mobile computing device may not be authenticated, and may be prevented from accessing the vehicle computing device, as the mobile computing device may be using a certificate stolen from a different mobile computing device.

A mobile computing device, such as a smartphone or tablet, may be used in conjunction with a vehicle computing device, such as the head unit of a cars audio/visual system or other on-board computer system. For example, a smartphone may be connected to a car's head unit to allow playback of media, such as music, from the smartphone, or use of other suitable features of the smartphone. When a mobile computing device is connected to a vehicle computing device, the vehicle computing device may need to authenticate the mobile computing device, for example, to ensure the mobile computing device is authorized to access the vehicle computing device. The mobile computing device may include a certificate that may uniquely identify the mobile computing device, allowing the vehicle computing device to determine the identity of the mobile computing device and whether the mobile computing device is authorized to access the vehicle computing device. The certificate may be issued to the mobile computing device during manufacture of the mobile computing device, and may be obtained from, for example, a manufacturer of the vehicle computing device or party responsible for the operating system or platform used by the vehicle computing device. Thus, the certificates may only be issued to mobile computing device that have been certified to work with the vehicle computing device.

The certificate may include a signature, which may be any suitable and verifiable signature for establishing the identity of the mobile computing device. For example, the signature may be an SSL signature which may be verified using a public key stored on the vehicle computing device. Generating a unique signature for every mobile computing device that may be authorized to access a vehicle computing device may be difficult, as there may be many millions of such devices. The number of certificate signatures generated may be fewer than the number of mobile computing devices to which the certificates will be issued, with different mobile computing devise having certificates with the same signature. For example, for 256 mobile computing devices, instead of generating 256 unique signatures, requiring a minimum of 8 bits to represent, only 16 signatures may be generated, requiring a minimum of 4 bits to represent, although more bits may be used to ensure the signature is complex enough that unauthorized parties cannot generate valid signatures. Each of the 16 signatures may be used in the certificates 16 different mobile computing devices apiece. For example, 16 of the mobile computing device may have a certificate with the signature "0001". The signature may be associated with a public key. For example, any suitable cryptographic system, such as SSL, may be used to generate both the signatures and the public keys that may be used to authenticate the signatures.

Because more than one mobile computing device may use the same signature in its certificate, it may be difficult for a vehicle computing device to verify whether a mobile computing device is authorized or is using a stolen certificate. To prevent the use of stolen certificates, a hardware key may be added to each certificate issued to each mobile computing device. The hardware key in a mobile computing device's certificate may be based on a hardware serial number taken from any suitable hardware component of the mobile computing device. For example, a USB chip on the mobile computing device may have a serial number, which may unique for every USB chip on every computing device. A network interface, such as a WiFi radio, may have a MAC address which is unique to every network interface on every computing device and may serve as a hardware serial number.

When a certificate, with non-unique signature, is issued to a mobile computing device, for example, during initial setup of the mobile computing device by the manufacturer, the hardware serial number of the selected hardware component of the mobile computing device may be used to generate the hardware key, which may be stored in the certificate before the certificate is issued. The hardware key may be generated from the hardware serial number in any suitable manner. For example, a hashing algorithm may be used to hash the hardware serial number, reducing, for example a USB serial number of 192 bits to a hardware key of 32 bits. The hardware key may be stored in the certificate in any suitable manner, for example, in a section of the certificate reserved for "extra" data. Each mobile computing device may have a unique hardware key stored in its certificate, even when the signature in the certificate is a duplicate, due to the uniqueness of the hardware serial number and the use of an appropriate hashing algorithm.

The mobile computing device, including the certificate with the non-unique signature and the unique hardware key, may be connected to a vehicle computing device in any suitable manner. For example, a smartphone may be plugged into a car's head unit using a USB cable. The vehicle computing device may authenticate the mobile computing device based on the certificate stored on the mobile computing device. For example, the vehicle computing device may use the public key, which may have been stored on the vehicle computing device during configuration by the manufacturer, to validate the non-unique signature in the mobile computing device's certificate. The vehicle computing device may ensure that the certificate on the mobile computing device was issued to that mobile computing device, and not stolen or otherwise obtained from a different mobile computing device, using the hardware key. The vehicle computing device may receive the hardware serial number from the hardware component of the mobile computing device. For example, the vehicle computing device may read the USB serial number off of the USB chip that is part of the connection between the vehicle computing device and the mobile computing device. The vehicle computing device may generate a hardware key, which may be used as a hardware key check, from the hardware serial number in the same manner, for example, by using the same hashing algorithm, as was used to generate the hardware key that is stored in the certificate of the mobile computing device. The hardware key check generated by the vehicle computing device may be compared to the hardware key stored in the certificate on the mobile computing device. If the hardware key check matches the hardware key, the certificate may belong to the mobile computing device, which may be authenticated by the vehicle computing device if the vehicle computing device can also authenticate the signature. If the hardware key check does not match that hardware key, the certificate may not belong to the mobile computing device, and may have been stolen from a different mobile computing device. The vehicle computing device may not authenticate the mobile computing device, even if the signature in the certificate can be validated.

For example, a smartphone may be issued a certificate with a signature of 0101. The signature may be a shared among a number of different smartphones. The smartphone may have a USB chip with a serial number of 842A480FG17P521N033Q2BV7. The hardware serial number may be hashed, for example, using MD5, to 3b22442436f8f85d01fe145e26b40d6d, which may be reduced to a 32 bit representation by discarding all but the last four characters, resulting in a hardware key 0d6d. This hardware key may be stored in the certificate issued to the smartphone along with the non-unique signature with a binary representation of 0101. The smartphone may be connected to the head unit in a car, for example, using a USB cable. The head unit in the car may receive the serial number of the USB chip in the smartphone, for example, reading the serial number directly off of the USB chip. The head unit may then hash the retrieved serial number of 842A480FG17P521N033Q2BV7 using MD5, and reduce the result to a 32 bit by discarding all but the last four characters in the hash, resulting in a hardware key check of 0d6d. This may match the hardware key stored in the smartphone's certificate, allowing the head unit to continue authenticating the smartphone, for example, authenticating the non-unique certificate of 0101 using SSL and a public key stored on the head unit.

The smartphone's certificate may be stolen, or otherwise moved, to a second smartphone. When the second smartphone is connected to the head unit in the car, the head unit may retrieve the serial number from the second smartphone's USB chip. The second smartphone's USB chip may have a serial number of O3NG6389DGD144511FWTN983. The head unit may hash this hardware serial number using MD5, resulting in a hash of f29ccbb3c5b6d5fead63a096f9ab65fe. Discarding all but the last four characters may result in a hardware key check of 65fe. The head unit may compare this generated hardware key check to the hardware key stored in the second's smartphone certificate, which may be 0d6d. The hardware key check may not match that hardware key, indicating that the second smartphone is using a certificate that was not issued to the second smartphone. The head unit may not authenticate the second smartphone, even though the second smartphone's certificate has a valid signature of 0101. The second smartphone may be prevented from accessing the head unit due to the use of a certificate that was not issued to the second smartphone.

The hardware key may be stored in the certificate in any suitable format. For example, the hardware key may be stored as a character string using any number of bits for each character. The hardware key may be any suitable number of bits in length. For example, the hardware serial number may be used as the hardware key without hashing or discarding any portion of the hardware serial number. Further, a hashed hardware serial number may be used as the hardware key without discarding any portion of the hash.

Figure 1:
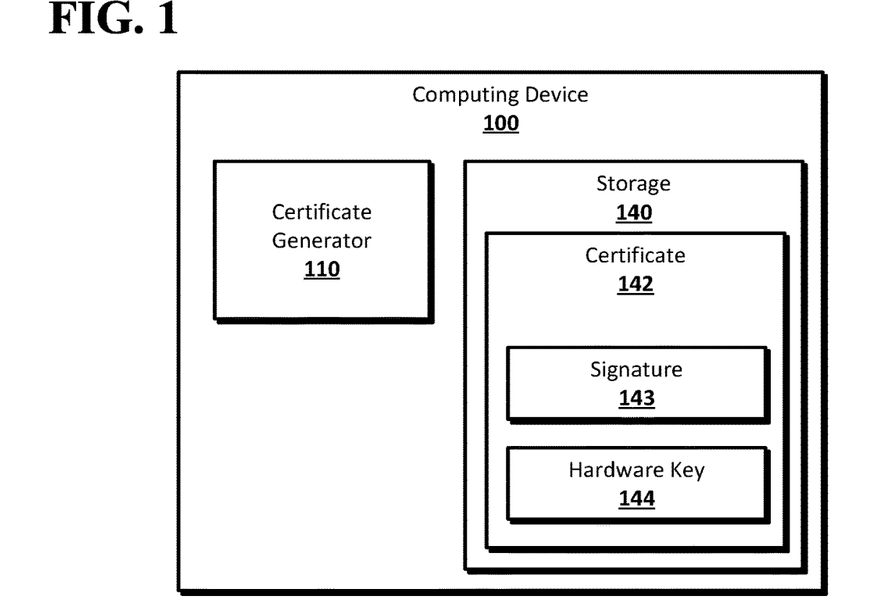
FIG. 1 shows an example system suitable for per-device authentication according to an implementation of the disclosed subject matter.

FIG. 1 shows an example system suitable for per-device authentication according to an implementation of the disclosed subject matter. A computing device 100 may include a certificate generator 110 and a storage 140. The computing device 100 may be any suitable device, such as, for example, a computer 20 as described in FIG. 9. The computing device 100 may be a single computing device, or may include multiple connected computing devices, and may be, for example, a server system used by a manufacturer of mobile computing devices. The certificate generator 110 may generate a certificate 142, including a signature 143 and a hardware key 144, for issuance to and use on a mobile computing device. The storage 140 may store the certificate 142 in any suitable manner.

The certificate generator 110 may be any suitable hardware and software on the computing device 100 for generating the certificate 142. For example, the certificate generator 110 may include cryptographic, hashing, and conversion hardware and software for generating a number of signatures, hashing hardware serial numbers, and converting the resulting hash into a hardware key. The certificate generator 110 may also, for example, receive a batch of signatures from, for example, the manufacturer of or party responsible for the operating system or platform used by vehicle computing devices, for use in generating the certificate 142. The certificate 142 may be generated for a mobile computing device, using the signature 143, which may be non-unique and used in certificates for other mobile computing devices, and the hardware key 144, which may be generated based on a hardware serial number of a hardware component of the mobile computing device.

Figure 2:
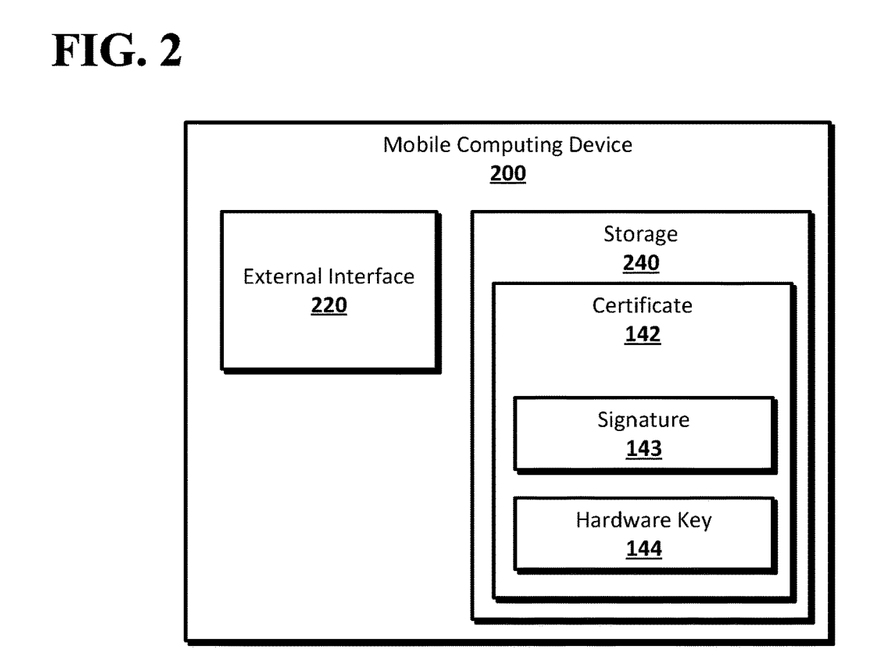
FIG. 2 shows an example system suitable for per-device authentication according to an implementation of the disclosed subject matter.

FIG. 2 shows an example system suitable for per-device authentication according to an implementation of the disclosed subject matter. A mobile computing device 200 may include an external interface 220, and a storage 240. The mobile computing device 200 may be any suitable device, such as, for example, a computer 20 as described in FIG. 9. The mobile computing device 200 may be a single computing device, or may include multiple connected computing devices, and may be, for example, a mobile computing device, such as a tablet, smartphone, or laptop. The external interface 220 may be allow the mobile computing device 100 to communicate with other computing devices, for example, a vehicle computing device, and include a hardware component that has a unique serial number. For example, the mobile computing device 200 may receive the certificate 142 from the computing device 100 during, for example, initial configuration of the mobile computing device 100 by its manufacturer. The storage 240 may store the certificate 142, including the signature 143 and hardware key 144, in any suitable manner. For example, the storage 240 may be secure storage, which may prevent tampering with the certificate 142. The signature 143 may be non-unique, and may be used in certificates issued to computing device other than the mobile computing device 100. The hardware key 144 may be generated by the certificate generator 110 from the hardware serial number of the hardware component in the external interface 220.

The external interface 220 may be any suitable combination of hardware and software on the mobile computing device 200 for connecting, using wires or wirelessly to a local area network or other local device. For example, the external interface 220 may use a WiFi radio to connect to a router that has created a local area network, or to connect directly to another device, may use a Bluetooth radio to connect directly to another device, or may use a USB cable to connect to another device. The external interface 220 may include a hardware component, such as a USB chip or network interface card, that may include a unique hardware serial number, such as a USB serial number or MAC address, that may be used by the certificate generator 110 to generate the hardware key 144 for inclusion in the certificate 142 issued from the computing device 100 to the mobile computing device 200. The hardware component of the external interface 220 may be accessible to other devices connected to the mobile computing device 200, for example, allowing the computing device 100 to read the hardware serial number to generate the hardware key 144, and allowing a vehicle computing device to access the hardware serial number to check the hardware key 144.

Figure 3:
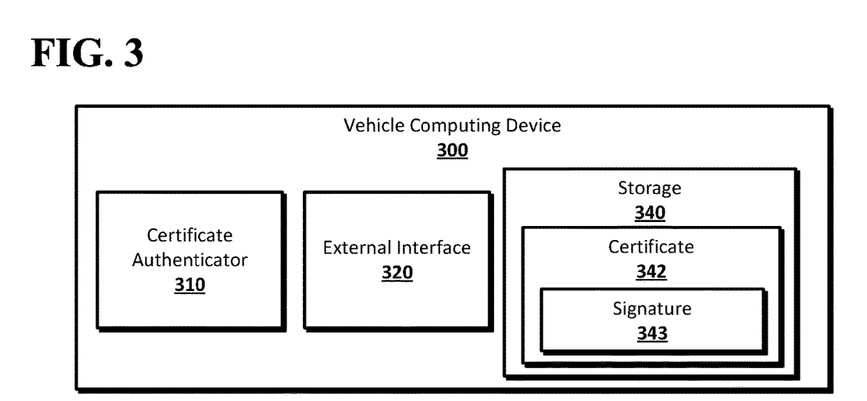
FIG. 3 shows an example system suitable for per-device authentication according to an implementation of the disclosed subject matter.

FIG. 3 shows an example system suitable for an interface for multiple media applications according to an implementation of the disclosed subject matter. A vehicle computing device 300 may include a certificate authenticator 310, an external interface 320, and a storage 340. The vehicle computing device 300 may be any suitable device, such as, for example, a computer 20 as described in FIG. 9. The vehicle computing device 300 may be a single computing device, or may include multiple connected computing devices, and may be, for example, part of the head unit of a vehicle's audio/visual system. The certificate authenticator 310 may check the certificate 142 of the mobile computing device 200 for authenticity, determining whether the mobile computing device 200 may access the vehicle computing device 300. The external interface 320 may allow the vehicle computing device 300 to communicate with other devices, such as the mobile computing device 100. A certificate 342 may include signature 343, which may allow the vehicle computing device 300 to be authenticated by the mobile computing device 200. The storage 340 may store the certificate 342 in any suitable manner.

The certificate authenticator 310 may be any suitable hardware and software on the vehicle computing device 300 for authenticating the certificate 142. For example, the certificate authenticator 310 may include cryptographic, hashing, and conversion hardware and software which may be the same or similar to that used by the certificate generator 110. For example, if the signature 143 was generated using SSL, the certificate authenticator 310 may use SSL to authenticate the signature 143. The certificate generator 310 may be able to authenticate the signature 143, hash hardware serial numbers, convert the resulting hash into a hardware key check, and compare that generated hardware key check to the hardware key 144 to check that the certificate 142 was issued to the mobile computing device 200, and was not taken from a different mobile computing device. The certificate authenticator 310 may, for example, receive a public key from, for example, the manufacturer of or party responsible for the operating system or platform used by vehicle computing devices, for use in authenticating the signature 143 from the certificate 142. The certificate authenticator 310 may generate the hardware key check that may be compared to the hardware key 144 based on the hardware serial number of the same hardware component of the external interface 220 used by the certificate generator 110 to generate the hardware key 144. For example, if the hardware key 144 was generated based on the serial number of a USB chip in the external interface 220 of the mobile computing device 200, the certificate authenticator 310 may retrieve the serial number of the USB chip in the external interface 220 of the mobile computing device 200 when generating a hardware key check to compare to the hardware key 144.

The external interface 320 may be any suitable combination of hardware and software on the vehicle computing device 200 for establishing a wired or wireless connection to a local area network or other local device, such as the mobile computing device 200. For example, the external interface 320 may use a USB connection to connect directly to another device.

Figure 4:
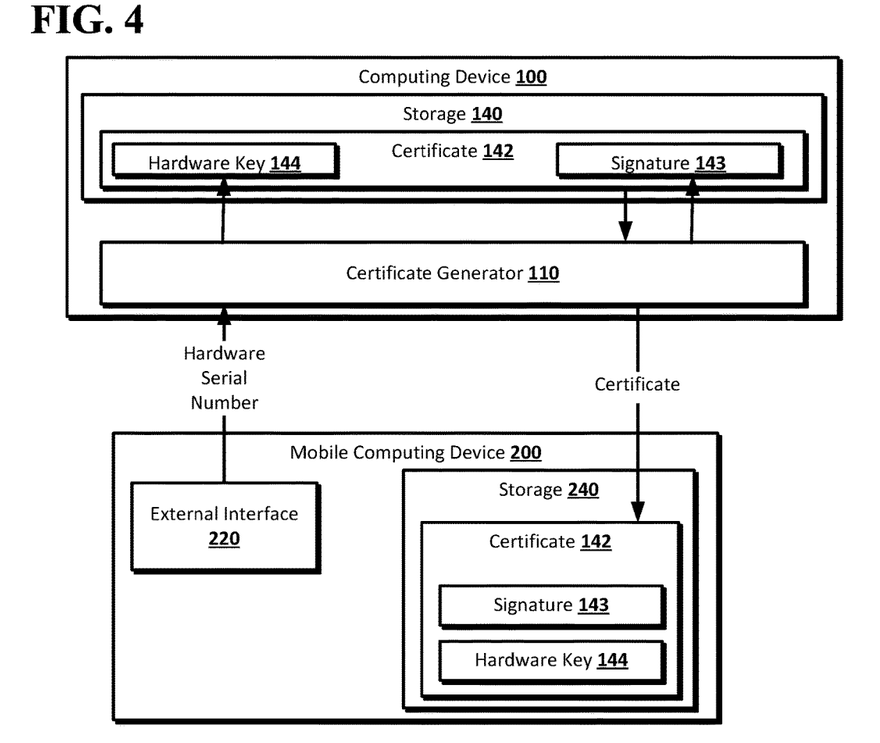
FIG. 4 shows an example arrangement for per-device authentication according to an implementation of the disclosed subject matter.

FIG. 4 shows an example arrangement for per-device authentication according to an implementation of the disclosed subject matter. The computing device 100 may issue certificate, such as the certificate 142, to mobile computing devices, such as the mobile computing device 200. For example, the mobile computing device 200 may be configured after being manufactured, which may include issuing certificates to the mobile computing device 200. The computing device 100, which may be, for example, part of the server system used by a manufacturer to configure devices, may receive the hardware serial number from the external interface 220 of the mobile computing device 200. The hardware serial number may be, for example, the serial number of a USB chip.

The certificate generator 110 of the computing device 100 may generate the hardware key 144 using the hardware serial number, for example, hashing the hardware serial number and reducing the number of bits used by discarding part of the hash. The hardware key 144 may be stored as part of the certificate 142. The signature 143 may also be stored in the certificate 142 by the certificate generator 110. The signature 143 may be generated by the certificate generator 110 using any suitable cryptographic system, or may be selected from a number of signatures provided to the computing device 100 by, for example, the manufacturer or party responsible for the operating system or platform of the vehicle computing device 300. The signature 143 may be non-unique.

The certificate 142 may be issued to the mobile computing device 200. Once the certificate generator 110 has generated the certificate 142, including the signature 143 and the hardware key 144, the certificate 142 may be transferred to the mobile computing device 200. For example, the certificate 142 may be copied from the storage 140 on the computing device 100 into the storage 240 on the mobile computing device 200.

Figure 5:
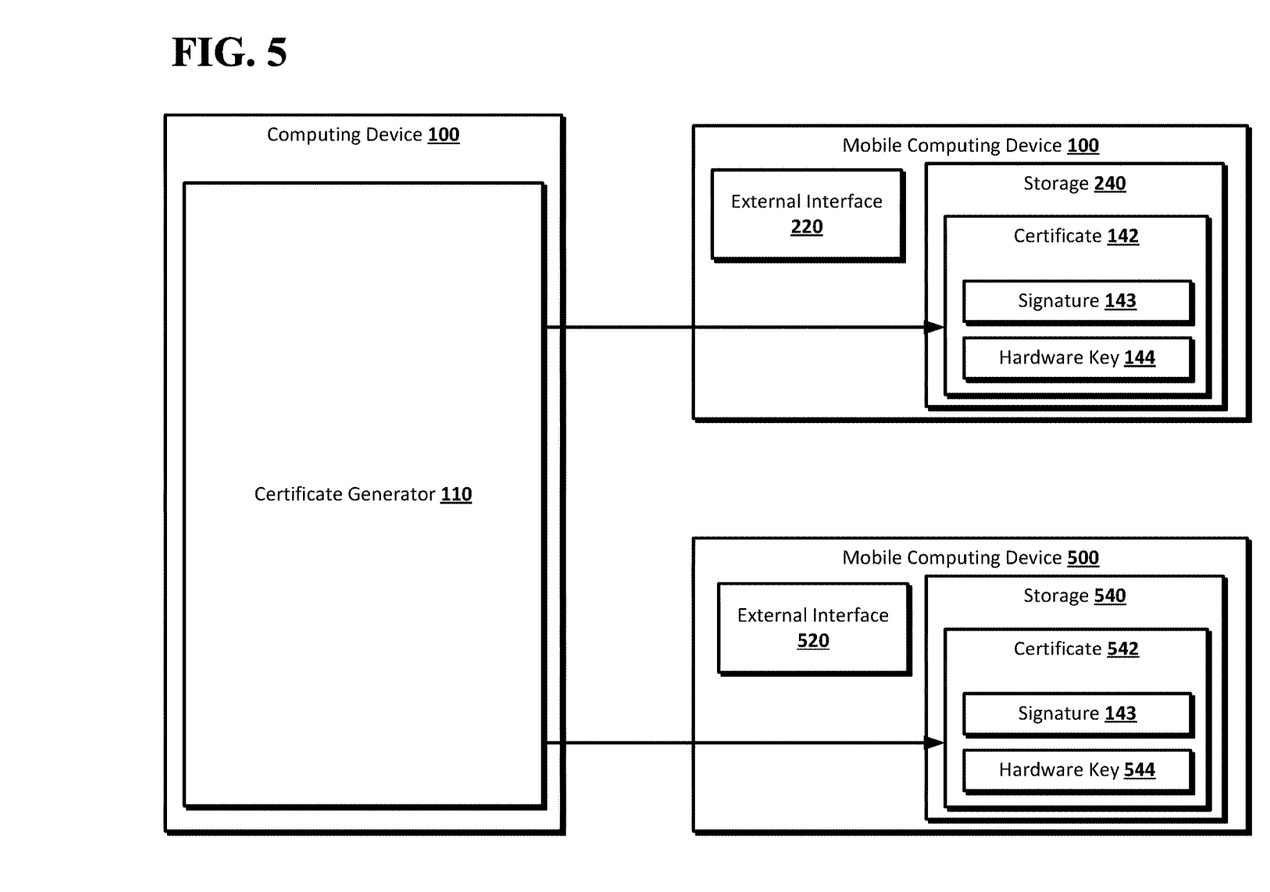
FIG. 5 shows an example arrangement for per-device authentication according to an implementation of the disclosed subject matter.

FIG. 5 shows an example arrangement for per-device authentication according to an implementation of the disclosed subject matter. The computing device 100 may be used to issue certificates, such as the certificate 142, to a number of mobile computing devices, some of which may be issued certificates that use the same signature. For example, the computing device 100 may issue the certificate 542 to the mobile computing device 500. The certificate 542 may include the same non-unique signature as the certificate 142, the signature 143. The hardware key 544 may be based on a hardware serial number of a hardware component of the external interface 540 of the mobile computing device 500, and may be different from the hardware key 144. Each certificate issued to a mobile computing device by the computing device 100 may include a unique hardware key, even when the signature is non-unique.

Figure 6:
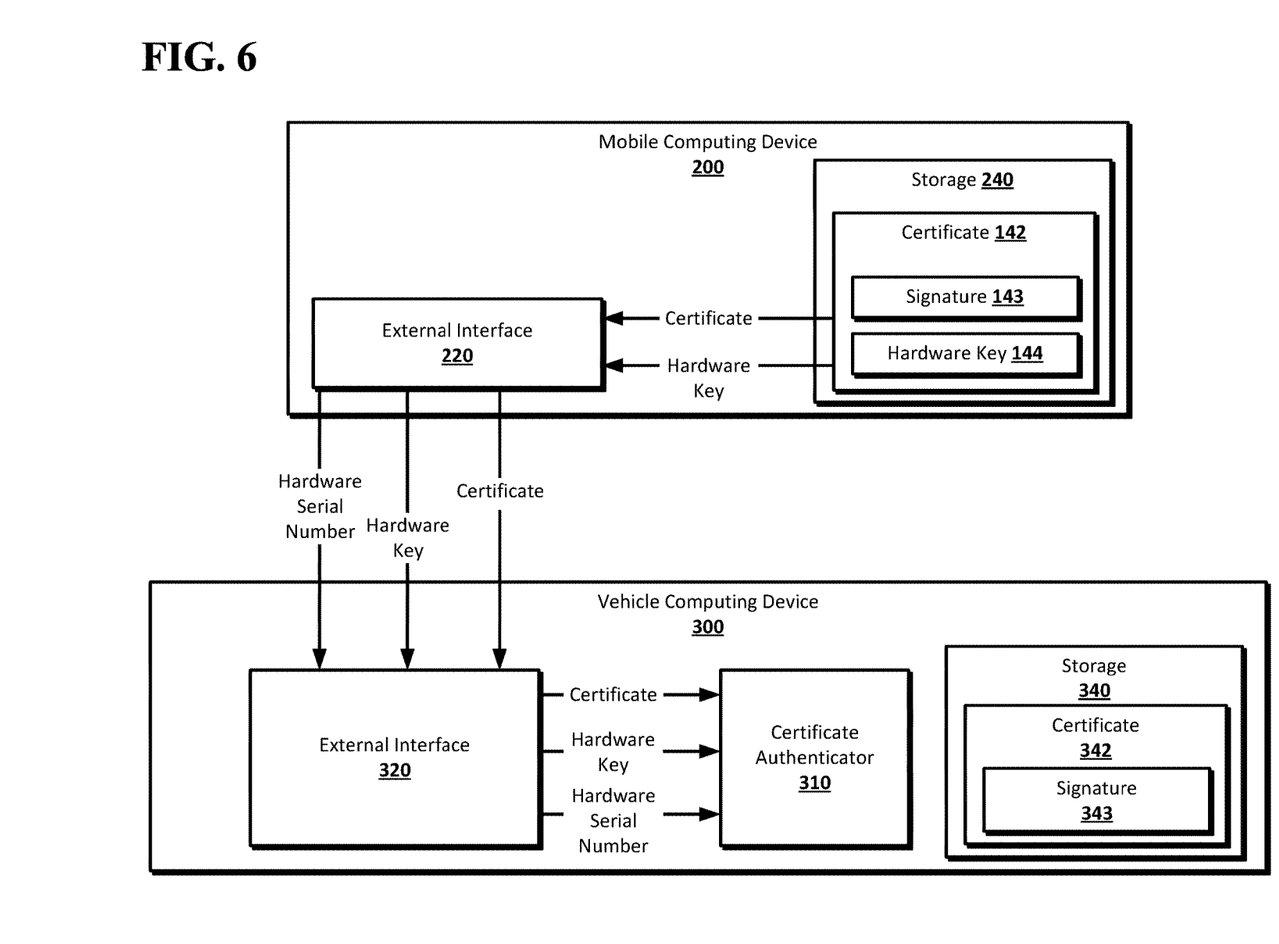
FIG. 6 shows an example arrangement for per-device authentication according to an implementation of the disclosed subject matter.

FIG. 6 shows an example arrangement for per-device authentication according to an implementation of the disclosed subject matter. The mobile computing device 200 may be connected to the vehicle computing device 300 by establishing a connection between the external interface 220 and the external interface 320. For example, a user may bring smartphone into a car and connect the smartphone to the car's head unit using a USB cable. The vehicle computing device 300 may receive the hardware serial number from the external interface 220 of the mobile computing device 200, for example, by reading the hardware serial number directly from the hardware component. For example, the head unit may read the USB serial number off of the USB chip in the smartphone that was used to establish the USB connection with the head unit.

The certificate authenticator 310 of the vehicle computing device 300 may attempt verify that the certificate 142 was issued to the mobile computing device 200, and was not obtained, for example, stolen, from another mobile computing device. The certificate authenticator 310 may hash the hardware serial number, reduce the number of bits in the resulting hash through discarding of parts of the hash, and convert the remaining portion of the hash to a hardware key check, all in the same manner as the certificate generator 110 when the hardware key 144 was first generated. The vehicle computing device 320 may receive the hardware key 144 from the certificate 142 on the mobile computing device 200, and the certificate generator 320 may compare the hardware key 144 to the hardware key check generated on the vehicle computing device 300. If the hardware key check matches the hardware key 144, the certificate 142 may have been issued to the mobile computing device 200, and the vehicle computing device 200 may authenticate the mobile computing device 200, for example, using a public key to authenticate the signature 143. The certificate authenticator 310 may authenticate the signature 143 of the certificate 142 before, during, or while verifying the certificate 142 based on the hardware key 144. When both the hardware key 144 and the signature 143 have been authenticated, the mobile computing device 200 may be permitted access to the vehicle computing device 300. For example, a smartphone may playback music or implement other functionality using the head unit of the car's audio/visual system.

If the hardware key check does not match the hardware key 144, this may indicate that the certificate 142 was taken from a different mobile computing device, which had a different hardware serial number than the mobile computing device 200. The certificate authenticator 310 may not authenticate the mobile computing device 200, preventing the mobile computing device 200 from accessing the vehicle computing device 300. For example, if the certificate 142 was generated for a first smartphone, having a USB chip with a first serial number, the hardware key 144 may only be verified with a hardware key check generated using that first serial number. A second smartphone, with a USB chip with a second serial number, may be unable to use the certificate 142 with the vehicle computing device 300, as the second serial number may result in a hardware key check that does not match the hardware key 144.

Figure 7:
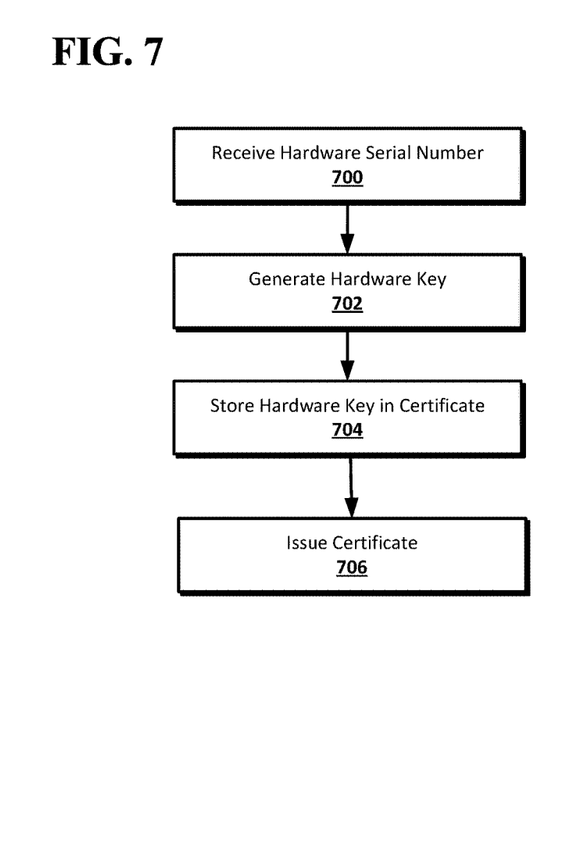
FIG. 7 shows an example of a process for per-device authentication according to an implementation of the disclosed subject matter.

FIG. 7 shows an example of a process per-device authentication according to an implementation of the disclosed subject matter. At 700, a hardware serial number may be received. For example, the computing device 100 may receive a hardware serial number for a hardware component of the external interface 220 of the mobile computing device 200. The hardware serial number may be, for example, a USB serial number for a USB chip, or a MAC address for a network interface card.

At 702, a hardware key may be generated. For example, the certificate generator 110 on the computing device 100 may use the hardware serial number to generate the hardware key 144. The hardware key may be generated in any suitable manner, such as, for example, hashing of the hardware serial number with a suitable hashing algorithm and discarding of a portion of the resulting hash. The hardware key 144 may be unique to the mobile computing device 200, as the hardware key 144 may be based on the unique hardware serial number.

At 704, the hardware key may be stored in a certificate. For example, the certificate generator 110 may store the hardware key 144 in the certificate 142 on the computing device 100. The certificate 142 may also include the signature 143, which may be any suitable signature for a cryptographic system, such as SSL. The signature 143 may be non-unique, and may be used in certificates other than the certificate 142 issued to mobile computing devices other than the mobile computing device 200. The certificate generator 110 may generate the signature 143 using any suitable cryptographic system, or may have obtained the signature 143 from an outside party, such as, for example, a manufacturer of the vehicle computing device 300 or party responsible for the operating system or platform used by the vehicle computing device 300.

At 706, the certificate may be issued. For example, the computing device 100 may issue the certificate 142 to the mobile computing device 200. The certificate 142, including the signature 143 and the hardware key 144, may be moved from the storage 140 on the computing device 100 to the storage 240 on the mobile computing device 200. The storage 240 may be, for example, secure storage for certificates. The computing device 100 may issue the certificate 142 as part of the initial setup and configuration of the mobile computing device 200 to prepare the mobile computing device 200 for distribution and sale after manufacture.

Figure 8:
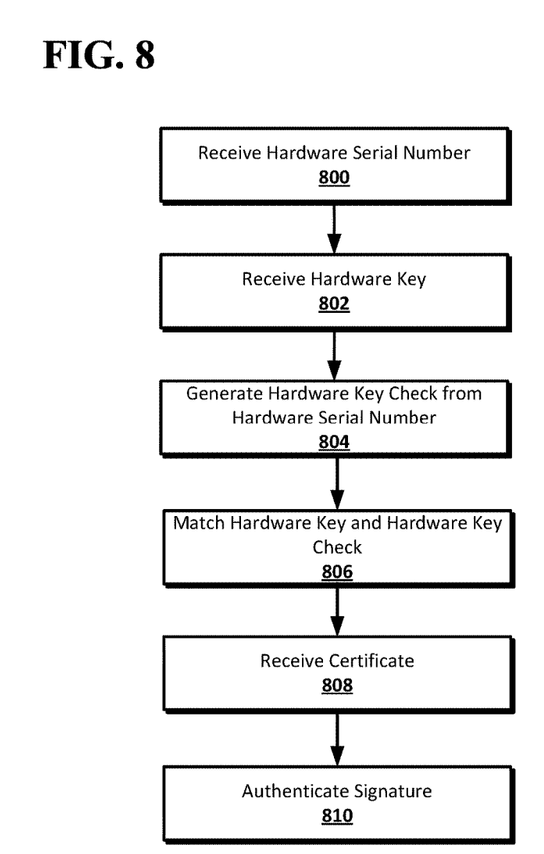
FIG. 8 shows an example of a process for per-device authentication according to an implementation of the disclosed subject matter.

FIG. 8 shows an example of a process for per-device authentication according to an implementation of the disclosed subject matter. At 800, a hardware serial number may be received. For example, the mobile computing device 200 may be connected to the vehicle computing device 300. A connection may be established between the external interface 220 and the external interface 320, for example, using a USB cable. The vehicle computing device 300 may receive a hardware serial number for a hardware component of the external interface 220 of the mobile computing device 200. The hardware serial number may be, for example, a USB serial number for a USB chip, or a MAC address for a network interface card.

At 802, a hardware key may be received. For example, the hardware key 144 from the certificate 142 on the mobile computing device 200 may be received by the vehicle computing device 300. The hardware key 144 may be received in response to a request, for example, from the certificate authenticator 310, or may be received automatically whenever a connection is established between the mobile computing device 200 and the vehicle computing device 300.

At 804, a hardware key check may be generated. For example, the certificate authenticator 310 on the vehicle computing device 300 may use the hardware serial number to generate the hardware key check. The hardware key check may be generated in the same manner as the hardware key 144, for example, hashing of the hardware serial number with the same hashing algorithm used by the certificate generator 110 and discarding of the same portion of the resulting hash.

At 806, the hardware key check may be matched to the hardware key. For example, the hardware key check may be compared with the hardware key 144 to determine if they match. The hardware key check may match the hardware key 144 when both were generated from the same hardware serial number, which may occur when the hardware serial number was received from the same hardware component by both the certificate generator 110 and the certificate authenticator 310. A match between the hardware key check and the hardware key 144 may indicate that the certificate 142 was issued to the mobile computing device 200, and was not taken from a different a mobile computing device. A match may verify the certificate 142. A mismatch between the hardware key check and the hardware key 144 may indicate that the certificate 142 was not issued to the mobile computing device 200, and may be stolen from another mobile computing device or otherwise illegitimately obtained. A mismatch may occur because the hardware key 144 was generated from a hardware serial number of a hardware component on some other mobile computing device, and the certificate 142 was issued to the other mobile computing device. The vehicle computing device 300 may have received the hardware serial number for the hardware component of the mobile computing device on which the certificate 142 is now stored, and that hardware serial number may not match the hardware serial number of the other mobile computing device, leading to the hardware key check being different from the hardware key 144.

At 808, a certificate may be received. For example, the vehicle computing device 300 may receive the entirety of the certificate 142, including the signature 143, from the mobile computing device 300. The certificate 142 may be received after a match has been found between the hardware key check and the hardware key 144, or, for example, may be received when a connection is established between the mobile computing device 200 and the vehicle computing device 300.

At 810, the signature may be authenticated. For example, the certificate authenticator 310 may authenticate the signature 143 from the certificate 142 using a public key. The public key may have been provided to the vehicle computing device 300 by, for example, the manufacturer of the vehicle computing device 300 or by a party responsible for the operating system or platform used by the vehicle computing device 300. The signature 143 may be authenticated using any suitable cryptographic system, such as, for example, SSL. When both the signature 143 is authenticated and the hardware key check verifies the certificate 142 by matching the hardware key 144, the mobile computing device 200 may be permitted access to the vehicle computing device 300, for example, to play back music through a vehicle's stereo system or implement any other suitable functionality.

Figure 9:
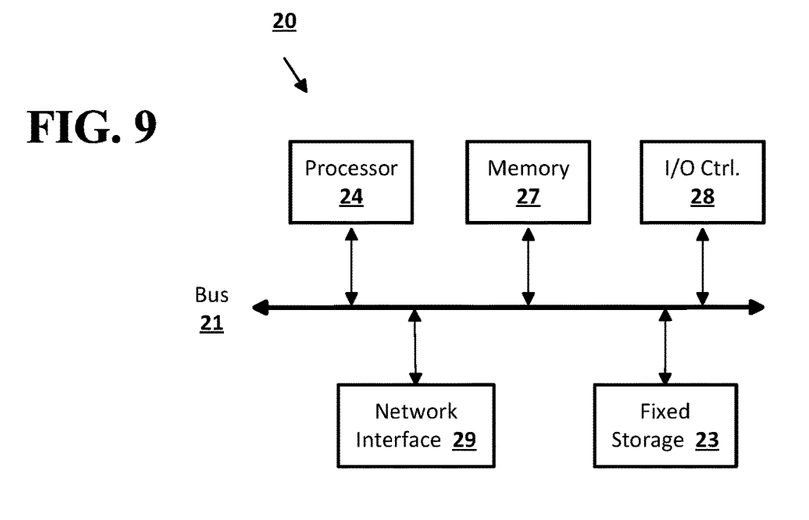
FIG. 9 shows a computer according to an embodiment of the disclosed subject matter.

Embodiments of the presently disclosed subject matter may be implemented in and used with a variety of component and network architectures. FIG. 9 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 10.

Many other devices or components (not shown) may be connected in a similar manner, such as document scanners, digital cameras, auxiliary, supplemental, or backup systems, or the like. Conversely, all of the components shown in FIG. 9 need not be present to practice the present disclosure. The components can be interconnected in different ways from that shown. The operation of a computer such as that shown in FIG. 9 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 10:
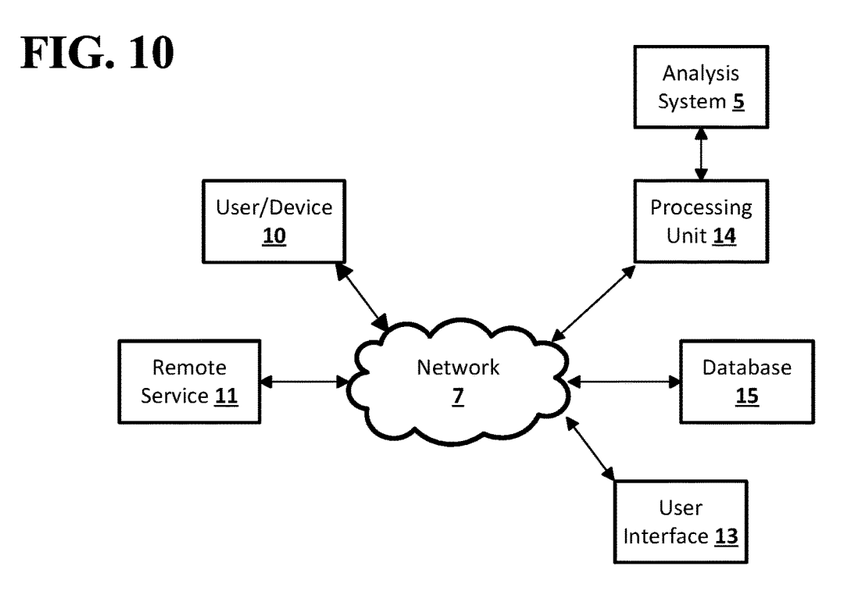
FIG. 10 shows a network configuration according to an embodiment of the disclosed subject matter.

FIG. 10 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

What is claimed is:

1. A method comprising:

receiving, by a first computing device and from a second computing device, a first digital certificate comprising a first hardware key and a digital signature, wherein the first hardware key was generated based on a hardware serial number associated with a hardware component of a fourth computing device, the hardware component of the fourth computing device being a particular type of hardware component;

generating, by the first computing device and based on a hardware serial number associated with a hardware component of the second computing device, a first hardware key check, the hardware component of the second computing device being of the particular type of hardware component;

determining, the first computing device, whether the first digital certificate is valid based on a comparison of the first hardware key and the first hardware key check;

responsive to determining that the first digital certificate is valid, permitting, by the first computing device, the second computing device to access the first computing device;

receiving, by the first computing device and from a third computing device, a second digital certificate comprising a second hardware key and the digital signature, wherein the second hardware key was generated based on a hardware serial number associated with a hardware component of a fifth computing device, the hardware component of the fifth computing device being of the particular type of hardware component;

generating, by the first computing device and based on the hardware serial number associated with a hardware component of the third computing device, a second hardware key check, the hardware component of the third computing device being of the particular type of hardware component;

determining, the first computing device, whether the second digital certificate is valid based on a comparison of the second hardware key and the second hardware key check; and responsive to determining that the second digital certificate is valid, permitting, by the first computing device, the third computing device to access the first computing device.

2. The method of claim 1, further comprising:
responsive to determining that the digital certification is not valid, preventing, by the first computing device, the second computing device from accessing the first computing device.

3. The method of claim 1, wherein generating the first hardware key check comprises:
applying, by the first computing device, a hash function to the hardware serial number associated with the hardware component of the second computing device to generate a hashed value of the hardware serial number associated with the hardware component of the second computing device.

4. The method of claim 3, wherein generating the first hardware key check further comprising:
discarding, by the first computing device, a portion of the hashed value to generate a remaining portion of the hashed value,
wherein the remaining portion of the hashed value is the first hardware key check.

5. The method of claim 4,
wherein first hardware key is a portion of a hashed value generated by applying the hash function to the hardware serial number associated with the hardware component of the fourth computing device, and
wherein determining whether the first digital certificate is valid based on a comparison of the first hardware key and the first hardware key check comprises determining that the first digital certificate is valid when the first hardware key matches the first hardware key check.

6. The method of claim 1, wherein determining, the first computing device, whether the first digital certificate is valid further comprises:
authenticating, by the first computing device, the digital signature.

7. The method of claim 1, wherein the first computing device is a vehicle head unit, and wherein the second computing device is a mobile phone.

8. The method of claim 1, wherein the particular type of hardware component is one of a universal serial bus chip or a network interface.

9. A first computing device comprising:
one or more processors;
a network interface that receives, from a second computing device, a first digital certificate, and receives, from a third computing device, a second digital certificate, wherein the first digital certificate includes a first hardware key and a digital signature, wherein the first hardware key was generated based on a hardware serial number associated with a hardware component of a fourth computing device, the hardware component of the fourth computing device being a particular type of hardware component, wherein the second digital signature includes a second hardware key and the digital signature, and wherein the second hardware key was generated based on a hardware serial number associated with a hardware component of a fifth computing device, the hardware component of the fifth computing device being of the particular type of hardware component; and a computer-readable storage media that stores code executable by the one or more processors to:
generate, based on a hardware serial number associated with a hardware component of the second computing device, a first hardware key check, the hardware component of the second computing device being of the particular type of hardware component;
determine whether the first digital certificate is valid based on a comparison of the first hardware key and the first hardware key check;
responsive to determining that the first digital certificate is valid, permit the second computing device to access the first computing device;
generate, based on the hardware serial number associated with a hardware component of the third computing device, a second hardware key check, the hardware component of the third computing device being of the particular type of hardware component;
determine whether the second digital certificate is valid based on a comparison of the second hardware key and the second hardware key check; and
responsive to determining that the second digital certificate is valid, permit the third computing device to access the first computing device.

10. The first computing device of claim 9, wherein the code is further executable by the one or more processors to:
responsive to determining that the digital certification is not valid, prevent the second computing device from accessing the first computing device.

11. The first computing device of claim 9, wherein the code is further executable by the one or more processors to generate the first hardware key check by at least being executable by the one or more processors to:
apply a hash function to the hardware serial number associated with the hardware component of the first computing device to generate a hashed value of the hardware serial number associated with the hardware component of the second computing device.

12. The first computing device of claim 11, wherein the code is further executable by the one or more processors to generate the first hardware key check by at least being executable by the one or more processors to:
discard a portion of the hashed value to generate a remaining portion of the hashed value,
wherein the remaining portion of the hashed value is the first hardware key check.

13. The first computing device of claim 11,
wherein first hardware key is a portion of a hashed value generated by applying the hash function to the hardware serial number associated with the hardware component of the fourth computing device, and
wherein the code is further executable by the one or more processors to determine whether the first digital certificate is valid based on a comparison of the first hardware key and the first hardware key check by at least being executable by the one or more processors to determine that the first digital certificate is valid when the first hardware key matches the first hardware key check.

14. The first computing device of claim 9, wherein the code is further executable by the one or more processors to determine whether the first digital certificate is valid by at least being executable by the one or more processors to authenticate the digital signature.

15. The first computing device of claim 9, wherein the particular type of hardware component is one of a universal serial bus chip or a network interface.

16. The non-transitory computer-readable storage medium of claim 15, wherein the first computing device is a vehicle head unit, and wherein the second computing device is a mobile phone.

17. A non-transitory computer-readable storage medium encoded with instructions that, when executed, cause one or more processors of a first computing device to:
receive, from a second computing device, a first digital certificate comprising a first hardware key and a digital signature, wherein the first hardware key was generated based on a hardware serial number associated with a hardware component of a fourth computing device, the hardware component of the fourth computing device being a particular type of hardware component;
generate, based on a hardware serial number associated with a hardware component of the second computing device, a first hardware key check, the hardware component of the second computing device being of the particular type of hardware component;
determine whether the first digital certificate is valid based on a comparison of the first hardware key and the first hardware key check;
responsive to determining that the first digital certificate is valid, permit the second computing device to access the first computing device;
receive, from a third computing device, a second digital certificate comprising a second hardware key and the digital signature, wherein the second hardware key was generated based on a hardware serial number associated with a hardware component of a fifth computing device, the hardware component of the fifth computing device being of the particular type of hardware component;
generate, based on the hardware serial number associated with a hardware component of the third computing device, a second hardware key check, the hardware component of the third computing device being of the particular type of hardware component;
determine whether the second digital certificate is valid based on a comparison of the second hardware key and the second hardware key check; and
responsive to determining that the second digital certificate is valid, permit the third computing device to access the first computing device.

18. The non-transitory computer-readable storage medium of claim 17, wherein the instructions further cause the one or more processors to:
apply a hash function to the hardware serial number associated with the hardware component of the second computing device to generate a hashed value of the hardware serial number associated with the hardware component of the second computing device; and
discard a portion of the hashed value to generate a remaining portion of the hashed value,
wherein the remaining portion of the hashed value is the first hardware key check.

19. The non-transitory computer-readable storage medium of claim 18,
wherein first hardware key is a portion of a hashed value generated by applying the hash function to the hardware serial number associated with the hardware component of the fourth computing device, and
wherein the instructions further cause the one or more processors to determine that the first digital certificate is valid when the first hardware key matches the first hardware key check.

20. The non-transitory computer-readable storage medium of claim 17, wherein the instructions further cause the one or more processors to:
authenticate the digital signature.

* * * * *